(12) United States Patent  
Nozawa et al.

(10) Patent No.: US 10,788,430 B2  
(45) Date of Patent: Sep. 29, 2020

(54) SURFACE INSPECTION APPARATUS AND SURFACE INSPECTION METHOD

(71) Applicant: AISIN SEIKI KABUSHIKI KAISHA, Kariya-shi (JP)

(72) Inventors: Jin Nozawa, Anjo (JP); Yasuyuki Kuno, Miyoshi (JP); Yukio Ichikawa, Ichinomiya (JP); Masataka Toda, Toyohashi (JP); Munehiro Takayama, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 113 days.

(21) Appl. No.: 16/242,047

(22) Filed: Jan. 8, 2019

(65) Prior Publication Data

US 2019/0212275 A1 Jul. 11, 2019

(30) Foreign Application Priority Data

Jan. 10, 2018 (JP) .................................. 2018-002096

(51) Int. Cl.
*G01N 21/88* (2006.01)
*G06T 7/00* (2017.01)
(Continued)

(52) U.S. Cl.
CPC ....... *G01N 21/8851* (2013.01); *G01B 11/306* (2013.01); *G01N 21/8806* (2013.01);
(Continued)

(58) Field of Classification Search
None
See application file for complete search history.

(56) References Cited

U.S. PATENT DOCUMENTS 6,654,497 B1 * 11/2003 Kondo ...................... G06T 7/13
382/195
8,600,170 B2 * 12/2013 Kitamura ................ G06T 5/002
382/199

(Continued)

FOREIGN PATENT DOCUMENTS

JP 2004-93146 3/2004

*Primary Examiner* — Iman K Kholdebarin
(74) *Attorney, Agent, or Firm* — Oblon, McClelland, Maier & Neustadt, L.L.P.

(57) ABSTRACT

A surface inspection apparatus includes: an inspection pattern forming unit that forms inspection patterns; a projection unit that projects the inspection patterns onto an inspection target object; a captured image acquiring unit that acquires captured images of the inspection target object; an edge extraction image creating unit that extracts edges from captured images, and creates edge extraction images; a correction coefficient setting unit that sets a correction coefficient for correcting intensities of edges in the edge extraction image; an intensity correcting unit that corrects the intensities of the edges; a corrected edge extraction image creating unit that creates corrected edge extraction images; an integrated image creating unit that creates a single integrated image by integrating the brightness values at the same position of the inspection target object; and a determination unit that determines the presence or absence of unevenness on a surface of the inspection target object.

3 Claims, 7 Drawing Sheets

(51) Int. Cl.
*G06T 7/13* (2017.01)
*G01B 11/30* (2006.01)
*G01B 11/255* (2006.01)

(52) U.S. Cl.
CPC .............. *G06T 7/0006* (2013.01); *G06T 7/13* (2017.01); *G01B 11/255* (2013.01); *G01N 2021/8887* (2013.01)

(56) References Cited

U.S. PATENT DOCUMENTS

| | | | |
|---|---|---|---|
| 8,928,783 B2 * | 1/2015 | Yoshida | H04N 5/23219 348/222.1 |
| 2011/0085738 A1 * | 4/2011 | Kitamura | G06T 5/002 382/199 |
| 2012/0081512 A1 * | 4/2012 | Shimizu | G06K 9/00798 348/36 |
| 2015/0356374 A1 * | 12/2015 | Mase | G06K 9/4671 382/195 |

* cited by examiner

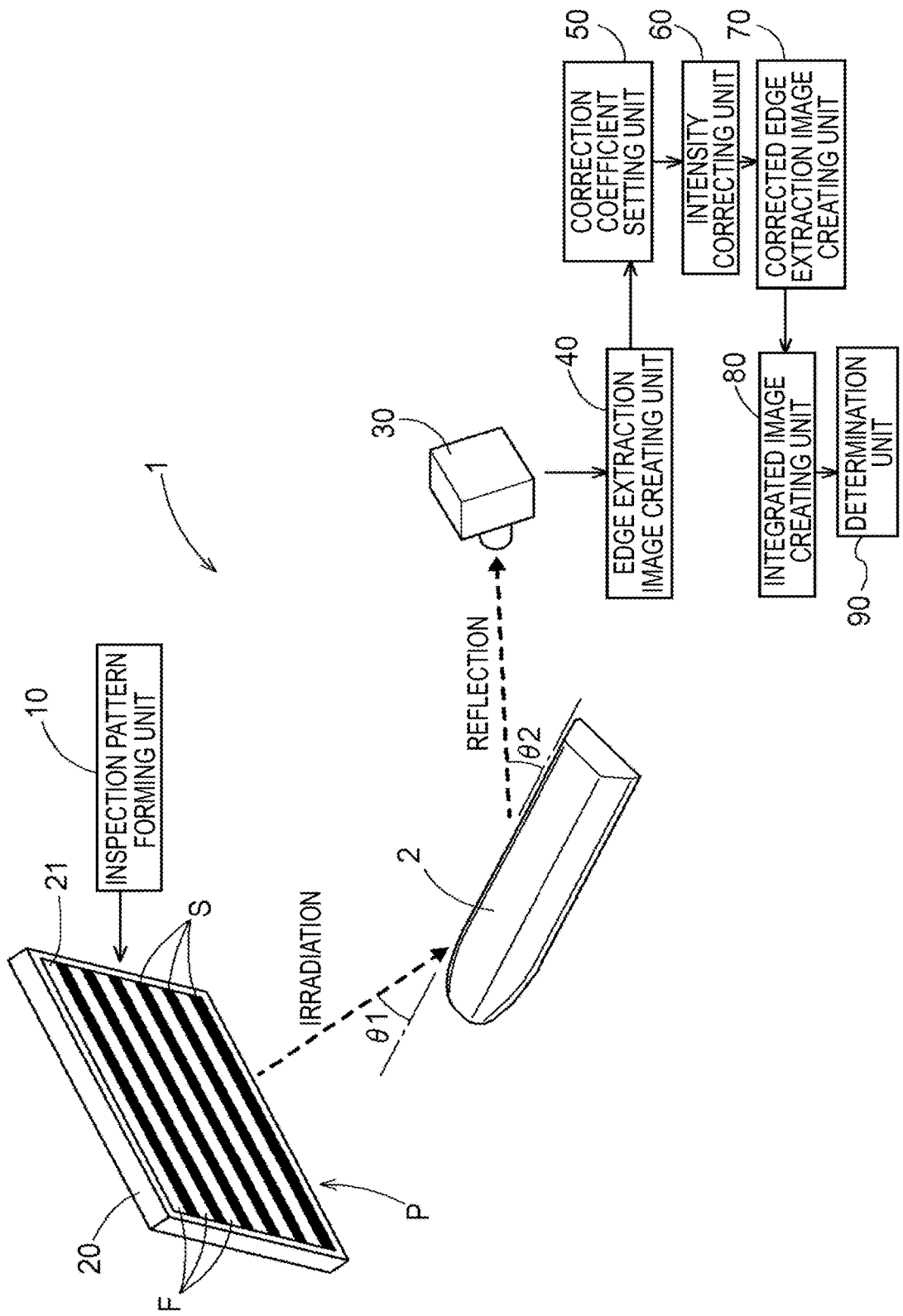

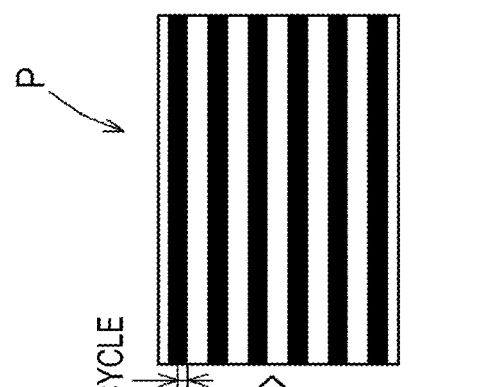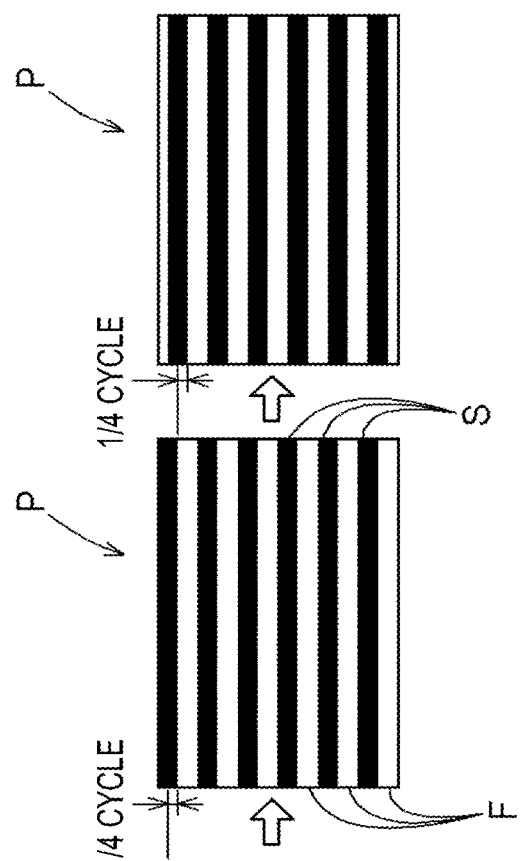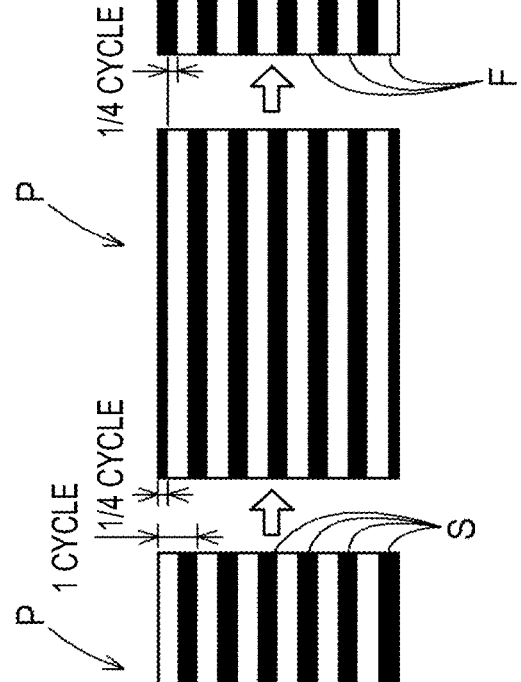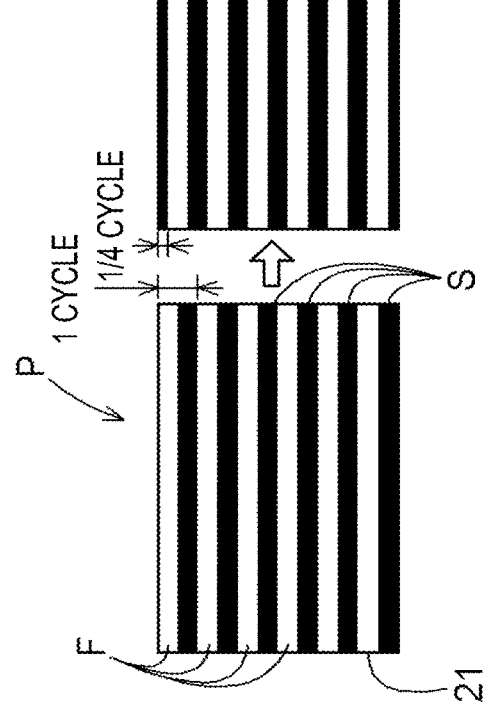

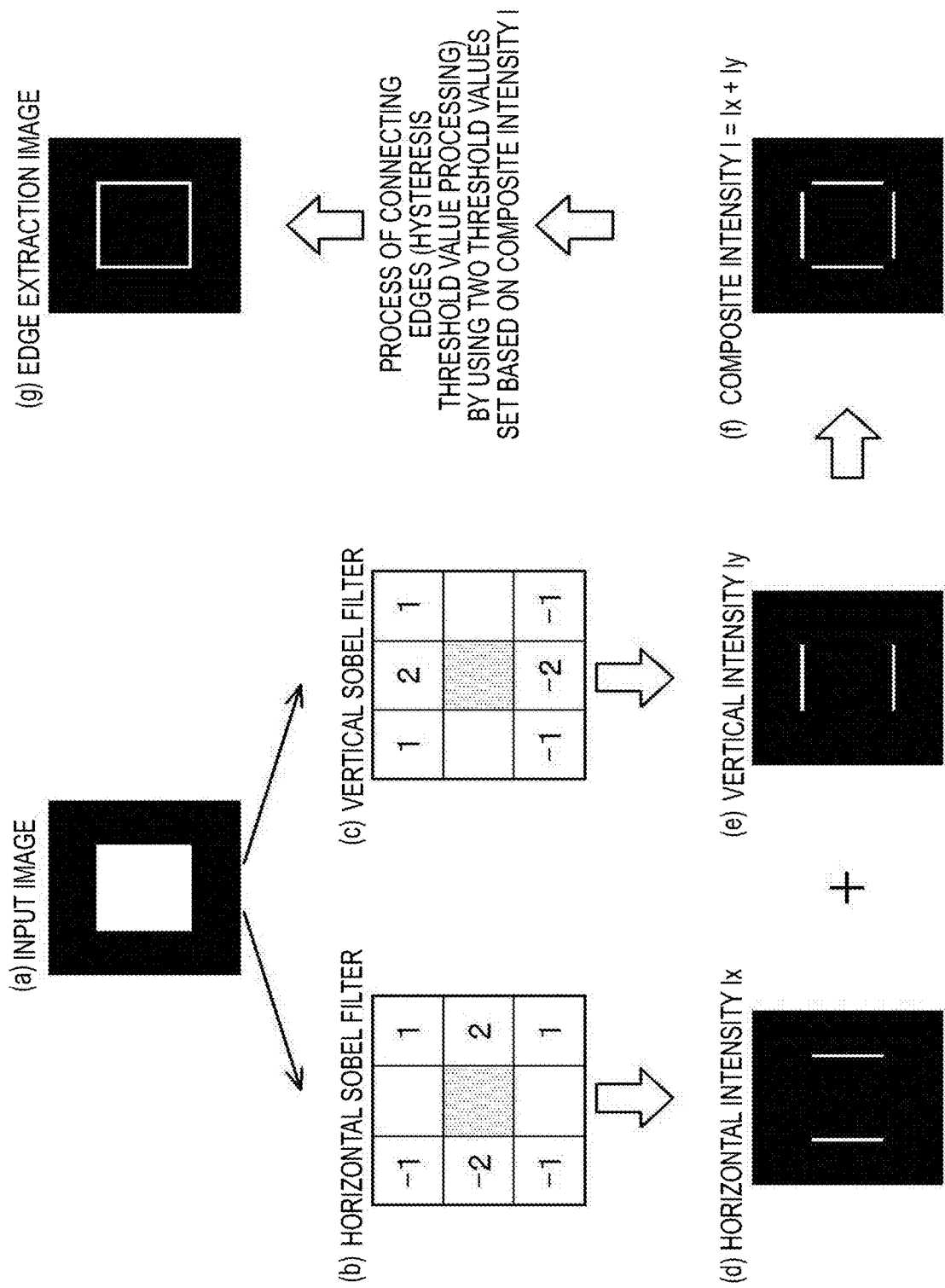

$$\theta = \arctan\left(\frac{R1}{R2}\right)$$

INTENSITY $R = (R2 \times \cos^2\theta + R1 \times \sin^2\theta)^{1/2}$

SURFACE INSPECTION APPARATUS AND SURFACE INSPECTION METHOD

CROSS REFERENCE TO RELATED APPLICATIONS

This application is based on and claims priority under 35 U.S.C. § 119 to Japanese Patent Application 2018-002096, filed on Jan. 10, 2018, the entire contents of which are incorporated herein by reference.

TECHNICAL FIELD

This disclosure relates to a surface inspection apparatus and a surface inspection method which inspect the presence or absence of unevenness on a surface of an inspection target object.

BACKGROUND DISCUSSION

In general, in manufacturing a product, when a surface of the product has unevenness (unevenness that is not derived from a shape of the product) larger than a predetermined standard, the product is considered as a defective product. Therefore, it is necessary to distinguish the defective product from products having unevenness that falls within the standard. Therefore, in the related art, there has been used a technology for inspecting the presence or absence of unevenness on a surface of a product (for example, JP2004-093146A (Reference 1)).

Reference 1 discloses an undulation inspection apparatus that inspects undulation of unevenness present on a surface of a sample to be inspected (corresponding to an "inspection target object" in the present application). The undulation inspection apparatus includes a patterning light source that irradiates a predetermined light source pattern to the sample to be inspected, an image capturing device that captures an image of the light source pattern irradiated to the sample to be inspected, a brightness center-of-gravity position calculating unit that calculates a center-of-gravity position of brightness of the light source pattern with respect to a predetermined threshold value based on a brightness of a pixel captured by the image capturing device, a weighting unit that weights a pixel at the brightness center-of-gravity position and a pixel adjacent to the pixel, and a determination unit that determines undulation of the surface of the sample to be inspected based on pixel values of the weighted pixels.

According to the technology disclosed in Reference 1, a stripe pattern is used as the light source pattern, the stripe pattern is projected onto the sample to be inspected from the light source, and pixel values of an image made by detecting edges of the stripes are accumulated, so that a defect of the surface is visibly ascertained. Here, the shape of the sample to be inspected is not limited to a single surface, but there are a plurality of surfaces in some cases. In a case where the sample to be inspected having a plurality of surfaces is inspected, in accordance with a position of the patterning light source that projects the stripe pattern and an installation angle of the inspection sample, a shadow, which is caused by one surface of the inspection sample, is reflected to the other surface in a captured image of the sample to be inspected onto which the light source pattern is projected, and as a result, there is a likelihood that light and darkness will occur along boundaries between the plurality of surfaces. In a case where pixels in the image, which have a brightness value larger than a predetermined threshold value, are connected and detected as edges, the edge derived from the boundary (the edge derived from the shape) and the edge derived from the projected stripe pattern (the edge derived from the unevenness on the surface) are sometimes simultaneously detected, and the two edges cannot be easily identified. For this reason, the technology disclosed in Reference 1 has room for improvement in properly inspecting the presence or absence of unevenness.

Thus, a need exists for a surface inspection apparatus and a surface inspection method which are not susceptible to the drawback mentioned above.

SUMMARY

A feature of a surface inspection apparatus according to an aspect of this disclosure resides in that the surface inspection apparatus includes: an inspection pattern forming unit configured to form a plurality of inspection patterns in which first patterns having a predetermined brightness or higher and second patterns having a brightness lower than the brightness of the first patterns are alternately arranged, and sequentially deviated by a predetermined deviation amount in a direction in which the first patterns and the second patterns are alternately arranged; a projection unit configured to project the plurality of inspection patterns formed by the inspection pattern forming unit onto an inspection target object by sequentially displaying the plurality of inspection patterns on a display screen; a captured image acquiring unit configured to acquire a captured image of the inspection target object each time the inspection pattern is projected; an edge extraction image creating unit configured to extract an edge from each of a plurality of captured images acquired by the captured image acquiring unit, and create an edge extraction image, for every captured image, which represents the extracted edge based on a difference in a brightness value between the edge and a portion other than the edge; a correction coefficient setting unit configured to set a correction coefficient for correcting an intensity of a first edge in a predetermined first direction in the edge extraction image and an intensity of a second edge in a second direction orthogonal to the first direction in the edge extraction image, based on the intensity of the first edge and the intensity of the second edge, so as to reduce a degree of influence of one of the intensity of the first edge and the intensity of the second edge against the other; an intensity correcting unit configured to correct the intensity of the first edge and the intensity of the second edge based on the correction coefficient; a corrected edge extraction image creating unit configured to create a plurality of corrected edge extraction images from the plurality of edge extraction images based on the intensity of the first edge and the intensity of the second edge which are corrected by the intensity correcting unit; an integrated image creating unit configured to create a single integrated image by integrating the brightness values at the same position of the inspection target object throughout the plurality of corrected edge extraction images; and a determination unit configured to divide the integrated image into a plurality of sections and determine the presence or absence of unevenness on a surface of the inspection target object based on the brightness values for every divided section.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a schematic view illustrating a configuration of a surface inspection apparatus;

FIGS. 2A to 2D are views illustrating an inspection pattern;

FIG. 5 is an explanatory view regarding a concept of extraction of an edge;

DETAILED DESCRIPTION

Figures 3A, 3B:
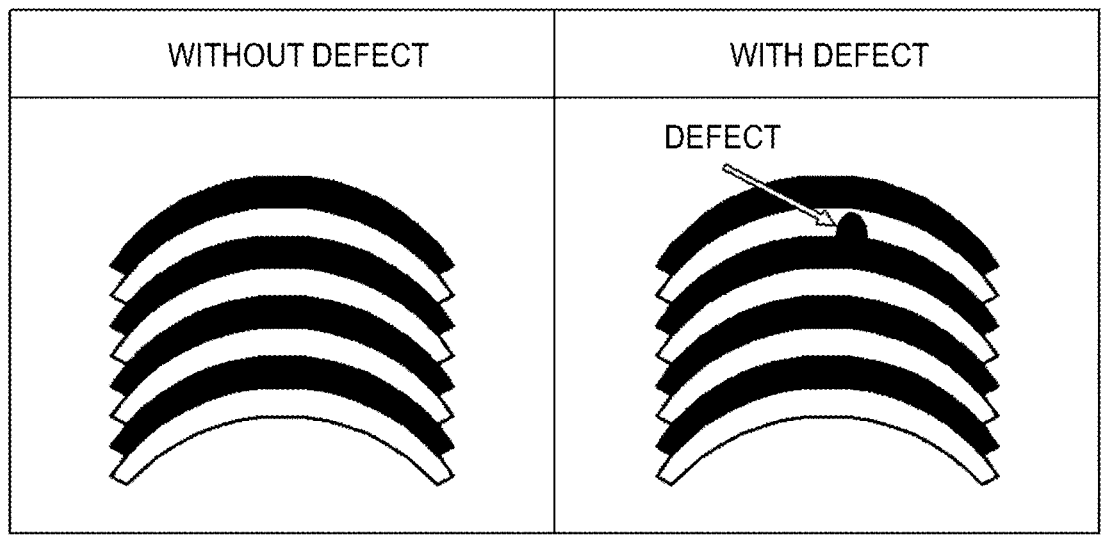
FIGS. 3A and 3B are views illustrating an example of a captured image.

A surface inspection apparatus according to an embodiment disclosed here is configured to be able to appropriately inspect the presence or absence of unevenness on a surface of an inspection target object. The unevenness on the surface of the inspection target object does not mean unevenness originally provided on the inspection target object (unevenness derived from a shape of the inspection target object) but means unevenness unintentionally formed on the surface of the inspection target object (unevenness that is not derived from the shape of the inspection target object). Hereinafter, a surface inspection apparatus 1 according to the present embodiment will be described.

FIG. 1 is a view schematically illustrating a configuration of the surface inspection apparatus 1 according to the present embodiment. As illustrated in FIG. 1, the surface inspection apparatus 1 includes an inspection pattern forming unit 10, a projection unit 20, a captured image acquiring unit 30, an edge extraction image creating unit 40, a correction coefficient setting unit 50, an intensity correcting unit 60, a corrected edge extraction image creating unit 70, an integrated image creating unit 80, and a determination unit 90. In particular, since the functional units including the inspection pattern forming unit 10, the edge extraction image creating unit 40, the correction coefficient setting unit 50, the intensity correcting unit 60, the corrected edge extraction image creating unit 70, the integrated image creating unit 80, and the determination unit 90 perform a process of inspecting the presence or absence of unevenness on a surface of an inspection target object, the functional units are constructed through hardware, software, or both of the hardware and the software while using a CPU as a core member.

The inspection pattern forming unit 10 forms an inspection pattern P in which first patterns F, which have a predetermined brightness or higher, and second patterns S, which have a brightness lower than the brightness of the first patterns F, are alternately arranged. The "first pattern F having a predetermined brightness or higher" is an indication which is displayed with predetermined luminance or higher when the inspection pattern P is displayed on a display screen 21 of the projection unit 20 to be described below, and for example, the first pattern F is an indication having white color. Meanwhile, the "second pattern S having a brightness lower than the brightness of the first pattern F" is an indication which is displayed with luminance lower than the brightness of the first pattern F when the inspection pattern P is displayed on the display screen 21, and for example, the second pattern S is an indication having black color. The inspection pattern P has the first patterns F and the second patterns S which are alternately arranged in a predetermined direction. In the present embodiment, as illustrated in FIG. 1, the first patterns F and the second patterns S are alternately arranged in a vertical direction of the display screen 21.

The inspection pattern forming unit 10 forms the plurality of inspection patterns P that sequentially deviate by a predetermined deviation amount in the direction in which the first patterns F and the second patterns S are alternately arranged. FIGS. 2A to 2D illustrate the plurality of inspection patterns P formed by the inspection pattern forming unit 10. The "direction in which the first patterns F and the second patterns S are alternately arranged" is a direction in which the first pattern F, the second pattern S, the first pattern F, and the second pattern S are arranged as illustrated in FIG. 2A, and particularly, this direction is the vertical direction of the display screen 21. The "deviation amount" is set in advance in the inspection pattern forming unit 10, and assuming that a vertical length, which is defined by the single first pattern F and the single second pattern S, is defined as one cycle, for example, as illustrated in FIG. 2A, the deviation amount may be set as a vertical length (a pitch in the display screen 21) made by dividing the one cycle into four sections (it is appropriate that the deviation amount is set to 2 dots on image data). In this case, as illustrated in FIGS. 2A to 2D, the four inspection patterns P are formed such that the first patterns F and the second patterns S sequentially deviate every ¼ cycle.

The process of forming the plurality of inspection patterns P in which the first patterns F having the predetermined brightness or higher and the second patterns S having the brightness lower than the brightness of the first pattern F are alternately arranged and which sequentially deviate by the predetermined deviation amount in the direction in which the first patterns F and the second patterns S are alternately arranged is referred to as an inspection pattern forming step in a surface inspection method.

Referring back to FIG. 1, the projection unit 20 sequentially displays the plurality of inspection patterns P, which are formed by the inspection pattern forming unit 10, on the display screen 21 and projects the plurality of inspection patterns P onto an inspection target object 2. For example, the projection unit 20 has a display unit such as a liquid crystal display or an organic EL display, and sequentially changes and displays the plurality of inspection patterns P, which are formed by the inspection pattern forming unit 10, on the display screen 21. Meanwhile, the inspection target object 2 is installed at a position spaced apart from the projection unit 20 at a predetermined distance. Therefore, the inspection pattern P displayed on the display screen 21 may be projected (irradiated) at a predetermined incident angle θ1 onto the inspection target object 2.

The process of sequentially displaying the plurality of inspection patterns P, which are formed by the inspection pattern forming step, on the display screen 21 and projecting the plurality of inspection patterns P onto the inspection target object 2 is referred to as a projection step in the surface inspection method.

The captured image acquiring unit 30 acquires a captured image of the inspection target object 2 each time the inspection pattern P is projected. As described above, the plurality of inspection patterns P are formed, and the projection unit 20 sequentially changes and displays the plurality of inspection patterns P. The captured image acquiring unit 30 acquires the captured image of the inspection target object 2 onto which the inspection pattern P is projected as the inspection pattern P is changed. FIGS. 3A and 3B illustrate an example of the captured image acquired by the captured image acquiring unit 30. FIG. 3A illustrates an example of a captured image when there is no defect on the surface of the inspection target object, and FIG. 3B illustrates an example of a captured image when there is a defect on the surface of the inspection target object. The captured image acquiring unit 30 may be configured by using an image capturing device such as, for example, a CMOS image sensor or a CCD image sensor. Further, the captured image acquiring unit 30 may be configured to acquire a captured image formed by specularly reflecting the inspection pattern P projected onto the inspection target object 2. That is, a reflection angle $\theta 2$ may be equal to the incident angle $\theta 1$. Further, $\theta 1$ and $\theta 2$ may be about 30 degrees.

The process of acquiring the captured image of the inspection target object 2 each time the inspection pattern P is projected is referred to as a captured image acquiring step in the surface inspection method.

Referring back to FIG. 1, the edge extraction image creating unit 40 extracts edges from the plurality of captured images acquired by the captured image acquiring unit 30, and creates edge extraction images, for every captured image, in which the extracted edges are indicated based on a difference in a brightness value between the edge and a portion which is not the edge. As illustrated in FIGS. 3A and 3B, the captured image is an image made as the first patterns F and the second patterns S of the inspection pattern P are reflected by the inspection target object 2. The edge extraction image creating unit 40 extracts (detects) the edges from the plurality of captured images acquired by the captured image acquiring unit 30, and the edge corresponds to a boundary between a color based on the first pattern F and a color based on the second pattern S in the captured image.

The process of extracting the edges from the plurality of captured images acquired by the captured image acquiring step and creating the edge extraction images, for every captured image, in which the extracted edges are indicated based on the difference in a brightness value between the edge and the portion which is not the edge is referred to as an edge extraction image creating step in the surface inspection method.

Figures 4A, 4B:
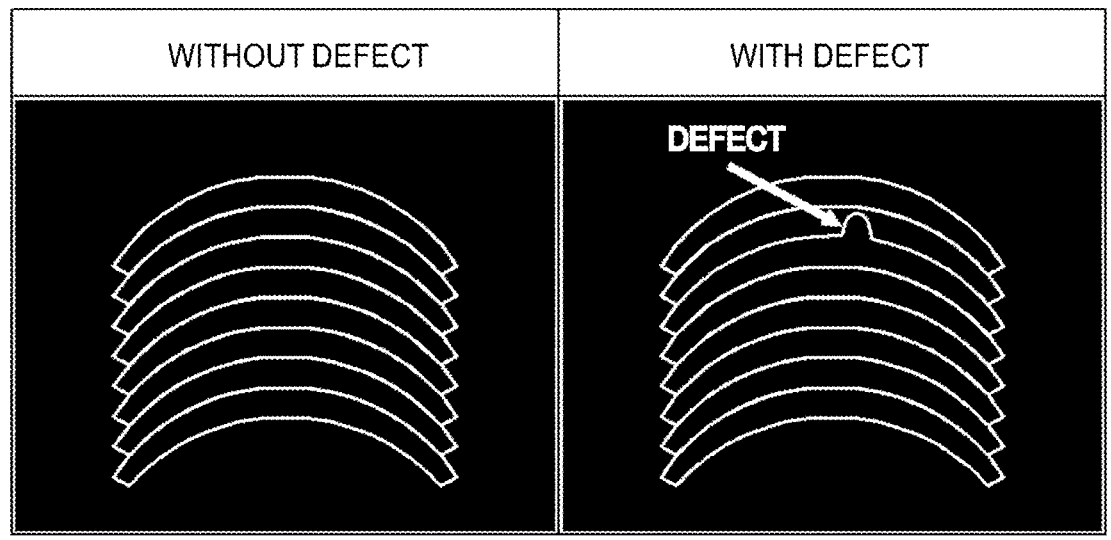
FIGS. 4A and 4B are views illustrating an example of an edge extraction image.

FIGS. 4A and 4B illustrate edge detection images made by extracting edges from the captured images illustrated in FIGS. 3A and 3B. To emphasize the extracted edges in the edge extraction images, edge portions are indicated with bright color (e.g., white) and the other portions, which are not the edges, are indicated with color (e.g., black) darker than the color of the edge portions, as illustrated in FIGS. 4A and 4B. Therefore, in the edge extraction image, the extracted edge and the portion, which is not the edge, are indicated based on a difference in a brightness value. The edge extraction image creating unit 40 creates the edge extraction images for every captured image acquired by the captured image acquiring unit 30. That is, when the number of captured images is n, n edge extraction images are also created.

The extraction of the edge may be performed by using, for example, the publicly known Canny method. FIG. 5 is an explanatory view of a concept of the extraction of the edge using the Canny method. For example, to extract an edge from an input image illustrated in part (a) of FIG. 5, a horizontal Sobel filter illustrated in part (b) of FIG. 5 and a vertical Sobel filter illustrated in part (c) of FIG. 5 are used. The Sobel filter, which is used to detect the edge from the input image, has a square matrix with a neighborhood number a (a=3, 5, 7, . . . 2n+1). The horizontal Sobel filter has the Gaussian distribution in which the entire central column is zero, and the vertical Sobel filter has the Gaussian distribution in which the entire central row is zero. The value a is appropriately selected in accordance with the input image. A horizontal edge is detected from the input image, as illustrated in part (d) of FIG. 5, when the horizontal Sobel filter is used, and a vertical edge is detected from the input image, as illustrated in part (e) of FIG. 5, when the vertical Sobel filter is used.

Assuming that an intensity of the horizontal edge is defined as a horizontal intensity Ix and an intensity of the vertical edge is defined as a vertical intensity Iy, a composite intensity I, which is an overall intensity, is expressed by the following Equation (1) (see part (f) of FIG. 5).

$$I=Ix+Iy \tag{1}$$

Here, if the edges are extracted by using a threshold value (a single threshold value) set based on the intensity merely calculated based on Equation (1), the horizontal edges and the vertical edges are sometimes not connected to one another, as illustrated in part (f) of FIG. 5. Therefore, in the related art, two threshold values (referred to as a "high threshold value" and a "low threshold value") are set based on the composite intensity I calculated based on Equation (1), and a process of connecting the edges (hysteresis threshold value processing) is performed by using the two threshold values. The high threshold value is a threshold value set according to an intensity of the edge to be detected, and the low threshold value is a threshold value for connecting broken contours as illustrated in part (f) of FIG. 5. Further, the low threshold value is a threshold value that is not used for all of the edges but used only to detect lines to be connected to lines detected based on the high threshold value. Therefore, as illustrated in part (g) of FIG. 5, the broken contours may be connected.

Figure 6:
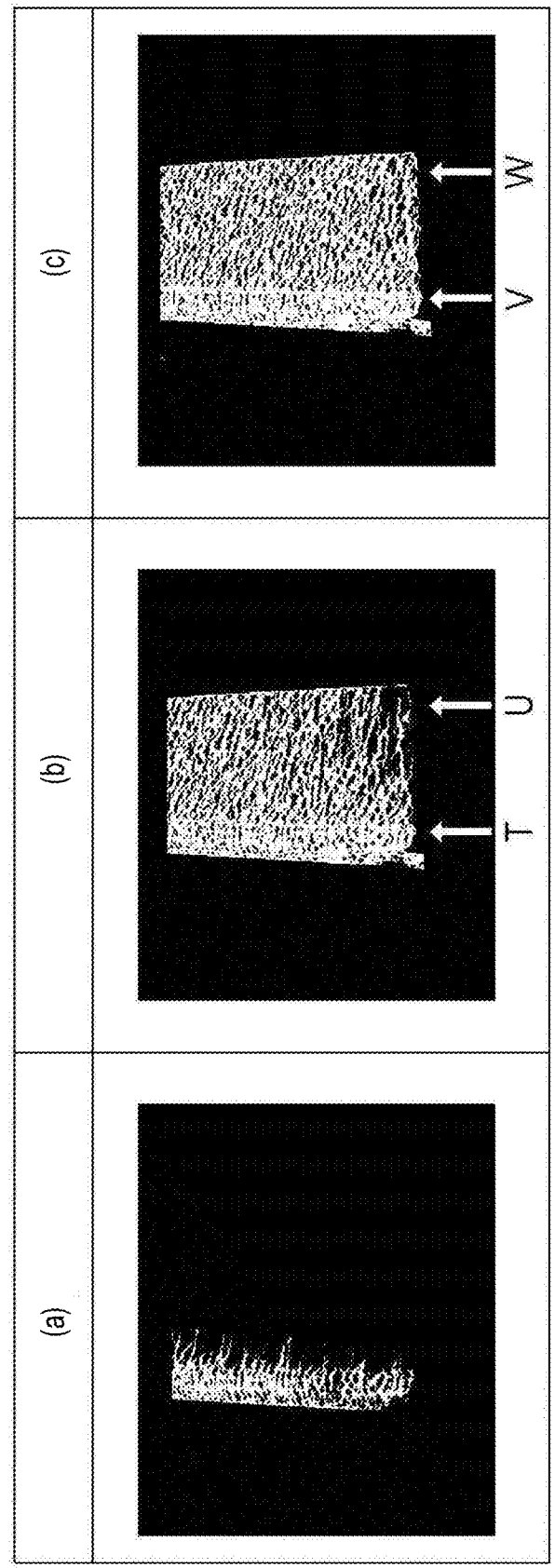
FIG. 6 is a view illustrating examples of the edge extraction image and a corrected edge extraction image.

Here, FIG. 6 illustrates examples of the edge extraction image. Part (a) of FIG. 6 illustrates an edge extraction image when the high threshold value and the low threshold value are set to predetermined threshold values. In this example, only a part of the inspection target object 2 is shown in the edge extraction image (an entire edge (contour) derived from the shape of the inspection pattern P is not shown). Therefore, the high threshold value is decreased to show the entire inspection target object 2 in the edge extraction image, such that the edge extraction image illustrated in part (b) of FIG. 6 is acquired. However, in the edge extraction image based on the edge extracted merely by decreasing the high threshold value, in accordance with the position of the projection unit 20 and the installation angle of the inspection target object 2, an edge caused by the shape of the inspection target object 2 is emphasized, like a region along T illustrated in part (b) of FIG. 6, and whether the edge is caused by unevenness on the surface of the inspection target object 2 is not easily determined. In addition, it is impossible to include the entire shape of the inspection target object 2 in the edge extraction image only by decreasing the high threshold value, and the edges in a region indicated by U in part (b) of FIG. 6 are broken. For this reason, it is impossible to inspect the presence or absence of unevenness throughout the entire inspection target object 2.

Therefore, based on an intensity of a first edge in a predetermined first direction in the edge extraction image and an intensity of a second edge in a second direction orthogonal to the first direction in the edge extraction image, the correction coefficient setting unit 50 sets correction coefficients for correcting the intensity of the first edge and the intensity of the second edge in order to reduce a degree of influence of one of the intensity of the first edge and the intensity of the second edge against the other. The "intensity of the first edge in the predetermined first direction in the edge extraction image" corresponds to the aforementioned horizontal edge in the edge extraction image in the present embodiment, and the "intensity of the second edge in the second direction orthogonal to the first direction in the edge extraction image" corresponds to the aforementioned vertical edge in the edge extraction image in the present embodiment. The "degree of influence of one of the intensity of the first edge and the intensity of the second edge against the other" refers to a degree of influence which causes the other of the first edge and the second edge to be hardly detected due to the intensity of one of the first edge and the second edge. As the degree of influence is increased, the other of the first edge and the second edge is hardly detected as described above.

Therefore, the correction coefficient setting unit 50 sets the correction coefficient for correcting the intensity of the first edge and the intensity of the second edge. As described above, assuming that the intensity of the horizontal edge is defined as the horizontal intensity Ix and the intensity of the vertical edge is defined as the vertical intensity Iy, the composite intensity I is expressed by Equation (1). The correction coefficient setting unit 50 sets correction coefficients A and B capable of correcting the horizontal intensity Ix and the vertical intensity Iy in Equation (1), respectively. However, $0 \leq A \leq 1$, and $0 \leq B \leq 1$. The composite intensity I corrected by the correction coefficients is expressed by Equation (2).

$$I = A \times Ix + B \times Iy \qquad (2)$$

Here, in a case where the edges are connected in the Canny method, the hysteresis threshold value processing is performed on the sum of the intensity of the horizontal edge and the intensity of the vertical edge, and as a result, it is possible to reduce the degree of influence of one of the intensity of the first edge and the intensity of the second edge against the other by correcting the horizontal edge and the vertical edge, as described above. Therefore, by setting in advance a direction of a contour of the inspection pattern P to be projected, it is possible to remove a contour derived from the shape and selectively extract only a contour of the projected stripe.

The process of setting the correction coefficient for correcting the intensity of the first edge and the intensity of the second edge, based on the intensity of the first edge in the predetermined first direction in the edge extraction image and the intensity of the second edge in the second direction orthogonal to the first direction in the edge extraction image, in order to reduce the degree of influence of one of the intensity of the first edge and the intensity of the second edge against the other, is referred to as a correction coefficient setting step in the surface inspection method.

It is appropriate that the correction coefficient setting unit 50 sets the correction coefficient so that the composite intensity of the intensity of the first edge and the intensity of the second edge is lower than an intensity of an edge in accordance with a magnitude of unevenness on the inspection target object 2 to be detected. The intensity of the edge in accordance with the magnitude of the unevenness on the inspection target object 2 to be detected may be specified by, for example, providing in advance unevenness on a limit sample or the like, irradiating the inspection pattern P to the limit sample, as described above, and then extracting edges. The correction coefficient setting unit 50 may be set the correction coefficient such that the composite intensity of the intensity of the first edge and the intensity of the second edge is lower than the intensity of the edge in accordance with of the magnitude of the unevenness to be detected, which is acquired from the limit sample. Therefore, the intensity of the edge resulting from the shape of the inspection target object 2 may be lower than the intensity of the edge resulting from the unevenness to be detected, and as a result, it is possible to prevent erroneous detection.

Figure 7:
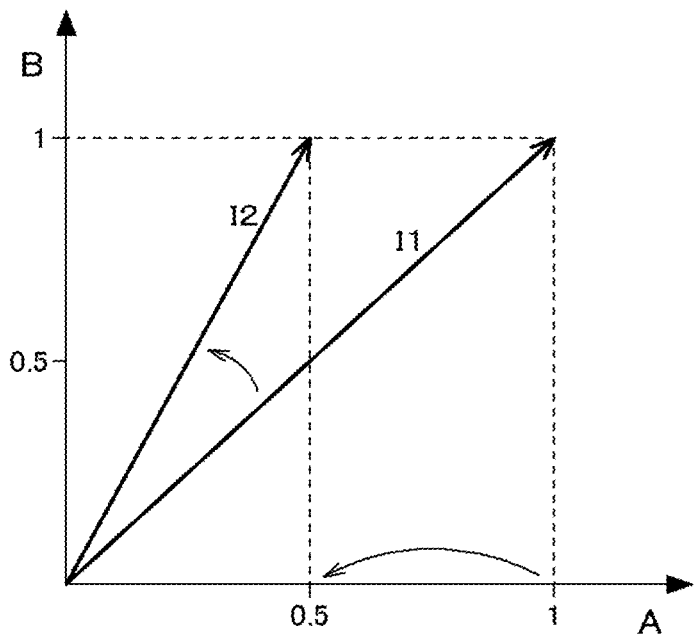
FIG. 7 is an explanatory view regarding correction of an intensity of an edge.

The intensity correcting unit 60 corrects the intensity of the first edge and the intensity of the second edge based on the correction coefficients. FIG. 7 illustrates an example in which A is 0.5 and B is 1 by the correction coefficient setting unit 50. The composite intensity I1 in the case where A and B are 1 may be changed to a composite intensity I2 by setting A to 0.5 and B to 1. The intensity correcting unit 60 corrects the intensity of the first edge and the intensity of the second edge by using the correction coefficients A and B set by the correction coefficient setting unit 50 and using Equation 2. The correction coefficients correspond to the weighting of the intensity, and it is possible to reduce the degree of influence of one of the intensity of the first edge and the intensity of the second edge against the other by correcting the intensity of at least any one of the first edge and the second edge. The composite intensity I2 is used for the hysteresis threshold value processing. That is, the two threshold values (the high threshold value and the low threshold value) are set based on the composite intensity I2, and as a result, like a region along V in part (c) of FIG. 6, it is possible to reduce the intensity of the edge derived from the shape of the inspection target object 2, and like a region along W in part (c) of FIG. 6, it is possible to connect the contour of the edge image.

The process of correcting the intensity of the first edge and the intensity of the second edge based on the correction coefficients is referred to as an intensity correcting step in the surface inspection method.

Based on the intensity of the first edge and the intensity of the second edge which are corrected by the intensity correcting unit 60, the corrected edge extraction image creating unit 70 creates a plurality of corrected edge extraction images from the plurality of edge extraction images. The intensity of the first edge and the intensity of the second edge which are corrected by the intensity correcting unit 60 are the intensity of the first edge and the intensity of the second edge corrected by using the correction coefficients A and B. The edge extraction image is created by the edge extraction image creating unit 40. In respect to the edge extraction images, the corrected edge extraction image creating unit 70 creates the corrected edge extraction images made by correcting the intensity of the first edge and the intensity of the second edge. That is, the corrected edge extraction image creating unit 70 creates the corrected edge extraction images based on the composite intensity of the intensity of the first edge and the intensity of the second edge. The sentence "the corrected edge extraction images are created based on the composite intensity of the intensity of the first edge and the intensity of the second edge" means that the edges are detected by using the two threshold values (the high threshold value and the low threshold value) set based on the aforementioned composite intensity.

The process of creating a plurality of corrected edge extraction images from the plurality of edge extraction images based on the intensity of the first edge and the intensity of the second edge which are corrected by the intensity correcting step is referred to as a corrected edge extraction image creating step in the surface inspection method.

Referring back to FIG. 1, the integrated image creating unit 80 creates a single integrated image by integrating brightness values at the same position in the inspection target object 2 throughout the plurality of corrected edge extraction images. The plurality of corrected edge extraction images are the edge extraction images created for every captured image captured by the corrected edge extraction image creating unit 70. Here, positional relationships between the projection unit 20, the captured image acquiring unit 30, and the inspection target object 2 are not changed until the plurality of inspection patterns P formed by the inspection pattern forming unit 10 are projected onto the inspection target object 2 and then the captured image acquiring unit 30 acquires all of the captured images in accordance with the plurality of inspection patterns P. For this reason, "the same position in the inspection target object 2" corresponds to the same position in the corrected edge extraction images.

Figure 8:
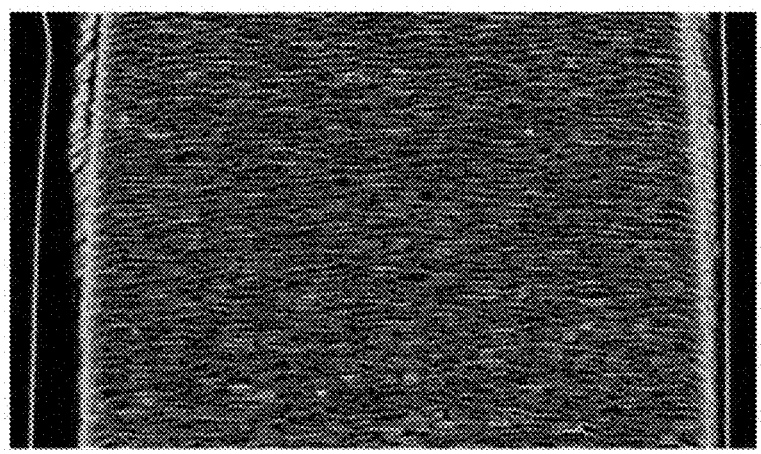
FIG. 8 is a view illustrating an example of an integrated image.

As described above, in the corrected edge extraction image, the edge portion is indicated with bright color (e.g., white) and the other portion, which is not the edge, is indicated with color (e.g., black) darker than the color of the edge portion. Therefore, the integrated image creating unit 80 integrates the brightness values at the same position throughout the plurality of corrected edge extraction images and creates the single integrated image in which the integrated result is indicated at a position corresponding to the position in the corrected edge extraction image. An example of the integrated image is illustrated in FIG. 8. Further, in the integrated image, for example, a Gaussian filter may be applied so that an edge is not formed due to irregularity or the like and a missing portion is not formed.

The process of creating the single integrated image by integrating brightness values at the same position in the inspection target object 2 throughout the plurality of corrected edge extraction images is referred to as an integrated image creating step in the surface inspection method.

The determination unit 90 divides the integrated image into a plurality of sections and determines the presence or absence of unevenness on the surface of the inspection target object 2 based on the brightness values for every divided section. The sentence "the integrated image is divided into the plurality of sections" means that the integrated image is divided into the sections having a predetermined size. In the present embodiment, the integrated image is divided in a grid pattern. It is appropriate that the section is formed so that, for example, the size of the section in the grid pattern has pixel resolving power such as 10×10 dot on screen data or is a size of 1 mm×1 mm on the surface of the inspection target object 2. When there is unevenness on the surface of the inspection target object 2, the brightness value of the edge in the corrected edge extraction image is increased, and as a result, the brightness value of the edge in the integrated image is also increased. When there is a section having a large brightness value (a section in which the brightness value is changed), the determination unit 90 determines, based on the size of the section, that there is unevenness on the surface of the inspection target object 2. Meanwhile, when there is no section having a large brightness value, the determination unit 90 determines that there is no unevenness on the surface of the inspection target object 2.

As described above, it is possible to inspect the presence or absence of unevenness on the surface of the inspection target object 2 by using the integrated image, but because the brightness value of the integrated image is irregular, it is not easy to perform the accurate inspection even though the predetermined threshold value is used. Therefore, it is appropriate that the determination unit 90 divides the integrated image into the plurality of sections and determines the presence or absence of unevenness on the surface of the inspection target object 2 based on the integrated value of the brightness values for every divided section.

For example, the determination unit 90 may perform the determination based on average values of the brightness values for every section. That is, the determination unit 90 calculates, for every divided section, the average values of brightnesses in the corresponding sections, and plots the calculated result on a map in which a vertical axis indicates an average brightness corresponding to calculated result and a horizontal axis indicates the sections.

The determination unit 90 plots the respective calculated results, and determines that there is no unevenness on the surface of the section when the average brightness of the objective section is less than a predetermined threshold value, and determines that there is unevenness on the surface of the section when the average brightness of the objective section exceeds the threshold value. Further, even though the result (average brightness) in each of the sections exceeds (goes beyond) the threshold value, in consideration of erroneous detection, irregularity, or the like, the entire inspection target object 2 may be evaluated as "no problem", for example, if a proportion of the number of sections determined as having unevenness to the number of all sections is equal to or less than a predetermined value.

The process of dividing the integrated image into the plurality of sections and determining the presence or absence of unevenness on the surface of the inspection target object 2 based on the brightness values for every divided section is referred to as a determination step in the surface inspection method.

Other Embodiments

Figure 9:
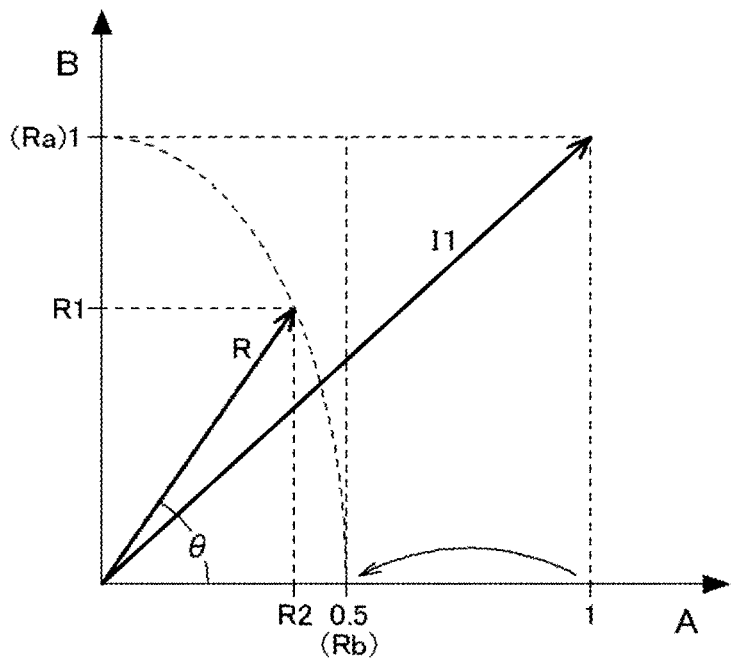
FIG. 9 is an explanatory view regarding correction of an intensity of an edge according to another embodiment.

In the embodiment, the example in which the quadrangular shape in FIG. 7 is used to correct the intensity has been described. An ellipse illustrated in FIG. 9 may be used instead of the quadrangular shape. In this case, values of the horizontal and vertical Sobel filters are calculated, respectively, and inclination angles θ thereof are calculated. A radius R of the ellipse based on a long side Ra and a short side Rb with respect to the angle is defined as an intensity R (R1 and R2 in FIG. 9) and the intensity R is used to connect a contour. In this way, to connect the edges, the edges may be detected by extracting the inclination angle θ and the intensity R of each pixel by the Sobel filters, and the detected edges may be connected.

Figure 10:
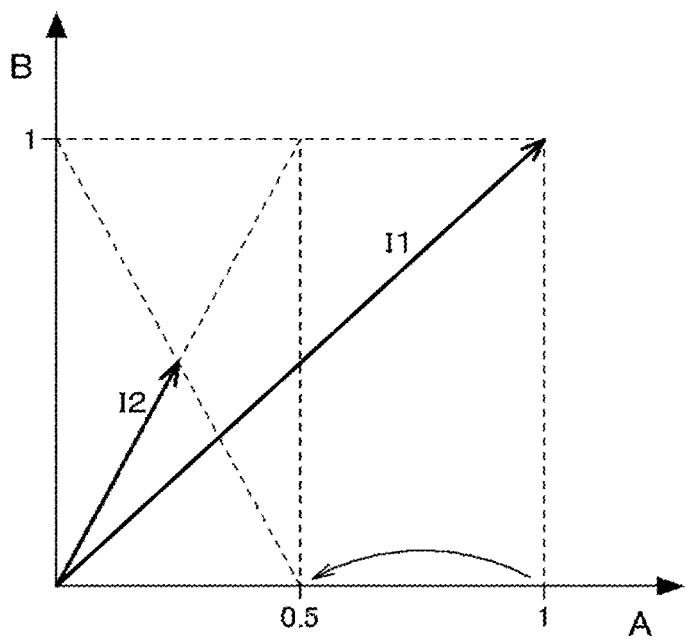
FIG. 10 is an explanatory view regarding correction of an intensity of an edge according to still another embodiment.

As illustrated in FIG. 10, in a case where the correction coefficient A is 0.5 and the correction coefficient B is 1, the composite intensity I2 at a point at which a set of diagonal lines intersect each other may be defined as an overall intensity, and then the high threshold value and the low threshold value may be set.

The embodiment disclosed here may be used for a surface inspection apparatus and a surface inspection method which inspect the presence or absence of unevenness on a surface of an inspection target object.

A feature of a surface inspection apparatus according to an aspect of this disclosure resides in that the surface inspection apparatus includes: an inspection pattern forming unit configured to form a plurality of inspection patterns in which first patterns having a predetermined brightness or higher and second patterns having a brightness lower than the brightness of the first patterns are alternately arranged, and sequentially deviated by a predetermined deviation amount in a direction in which the first patterns and the second patterns are alternately arranged; a projection unit configured to project the plurality of inspection patterns formed by the inspection pattern forming unit onto an inspection target object by sequentially displaying the plurality of inspection patterns on a display screen; a captured image acquiring unit configured to acquire a captured image of the inspection target object each time the inspection pattern is projected; an edge extraction image creating unit configured to extract an edge from each of a plurality of captured images acquired by the captured image acquiring unit, and create an edge extraction image, for every captured image, which represents the extracted edge based on a difference in a brightness value between the edge and a portion other than the edge; a correction coefficient setting unit configured to set a correction coefficient for correcting an intensity of a first edge in a predetermined first direction in the edge extraction image and an intensity of a second edge in a second direction orthogonal to the first direction in the edge extraction image, based on the intensity of the first edge and the intensity of the second edge, so as to reduce a degree of influence of one of the intensity of the first edge and the intensity of the second edge against the other; an intensity correcting unit configured to correct the intensity of the first edge and the intensity of the second edge based on the correction coefficient; a corrected edge extraction image creating unit configured to create a plurality of corrected edge extraction images from the plurality of edge extraction images based on the intensity of the first edge and the intensity of the second edge which are corrected by the intensity correcting unit; an integrated image creating unit configured to create a single integrated image by integrating the brightness values at the same position of the inspection target object throughout the plurality of corrected edge extraction images; and a determination unit configured to divide the integrated image into a plurality of sections and determine the presence or absence of unevenness on a surface of the inspection target object based on the brightness values for every divided section.

With this configuration, the intensity of the first edge and the intensity of the second edge are weighted by the correction coefficient, and as a result, it is possible to reduce the degree of influence of one of the intensity of the first edge and the intensity of the second edge against the other. The edges are detected by the intensity of the first edge and the intensity of the second edge which are corrected based on the correction coefficient, and as a result, it is possible to connect the edges derived from the inspection pattern (the edges that indicate a contour of the inspection target object) even though the edges are broken. In addition, it is possible to distinguish a contour resulting from a shadow formed in accordance with a lighting position and a shape of an inspection target object and a contour resulting from a projected stripe pattern, and as a result, it is possible to detect a contour based on the inspection pattern. Therefore, it is possible to appropriately inspect the presence or absence of unevenness on a surface of an inspection target object.

It is preferable that the corrected edge extraction image creating unit creates the corrected edge extraction images based on a composite intensity of the intensity of the first edge and the intensity of the second edge, and the correction coefficient is set such that the composite intensity is lower than an intensity of an edge in accordance with a magnitude of unevenness of the inspection target object to be detected.

When the composite intensity is corrected as described above, the inspection is performed without missing edges resulting from a magnitude of unevenness to be detected. Therefore, it is possible to appropriately inspect the presence or absence of unevenness on a surface of an inspection target object.

A feature of a surface inspection method according to another aspect of this disclosure resides in that the surface inspection method includes: forming a plurality of inspection patterns in which first patterns having a predetermined brightness or higher and second patterns having a brightness lower than the brightness of the first patterns are alternately arranged, and sequentially deviated by a predetermined deviation amount in a direction in which the first patterns and the second patterns are alternately arranged; projecting the plurality of inspection patterns formed in the forming onto an inspection target object by sequentially displaying the plurality of inspection patterns on a display screen; acquiring a captured image of the inspection target object each time the inspection pattern is projected; extracting an edge from each of a plurality of captured images acquired in the acquiring, and creating an edge extraction image, for every captured image, which represents the extracted edge based on a difference in a brightness value between the edge and a portion other than the edge; setting a correction coefficient for correcting an intensity of a first edge in a predetermined first direction in the edge extraction image and an intensity of a second edge in a second direction orthogonal to the first direction in the edge extraction image, based on the intensity of the first edge and the intensity of the second edge, so as to reduce a degree of influence of one of the intensity of the first edge and the intensity of the second edge against the other; correcting the intensity of the first edge and the intensity of the second edge based on the correction coefficient; creating a plurality of corrected edge extraction images from the plurality of edge extraction images based on the intensity of the first edge and the intensity of the second edge which are corrected in the correcting; creating a single integrated image by integrating the brightness values at the same position of the inspection target object throughout the plurality of corrected edge extraction images; and dividing the integrated image into a plurality of sections and determining the presence or absence of unevenness on a surface of the inspection target object based on the brightness values for every divided section.

The surface inspection method is not substantially different from the surface inspection apparatus and may exhibit the same effect as the surface inspection apparatus.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A surface inspection apparatus comprising:
an inspection pattern forming unit configured to form a plurality of inspection patterns in which first patterns having a predetermined brightness or higher and second patterns having a brightness lower than the brightness of the first patterns are alternately arranged, and sequentially deviated by a predetermined deviation amount in a direction in which the first patterns and the second patterns are alternately arranged;
a projection unit configured to project the plurality of inspection patterns formed by the inspection pattern forming unit onto an inspection target object by sequentially displaying the plurality of inspection patterns on a display screen;
a captured image acquiring unit configured to acquire a captured image of the inspection target object each time the inspection pattern is projected;
an edge extraction image creating unit configured to extract an edge from each of a plurality of captured images acquired by the captured image acquiring unit, and create an edge extraction image, for every captured image, which represents the extracted edge based on a difference in a brightness value between the edge and a portion other than the edge;
a correction coefficient setting unit configured to set a correction coefficient for correcting an intensity of a first edge in a predetermined first direction in the edge extraction image and an intensity of a second edge in a second direction orthogonal to the first direction in the edge extraction image, based on the intensity of the first edge and the intensity of the second edge, so as to reduce a degree of influence of one of the intensity of the first edge and the intensity of the second edge against the other;
an intensity correcting unit configured to correct the intensity of the first edge and the intensity of the second edge based on the correction coefficient;
a corrected edge extraction image creating unit configured to create a plurality of corrected edge extraction images from the plurality of edge extraction images based on the intensity of the first edge and the intensity of the second edge which are corrected by the intensity correcting unit;
an integrated image creating unit configured to create a single integrated image by integrating the brightness values at the same position of the inspection target object throughout the plurality of corrected edge extraction images; and
a determination unit configured to divide the integrated image into a plurality of sections and determine the presence or absence of unevenness on a surface of the inspection target object based on the brightness values for every divided section.

2. The surface inspection apparatus according to claim 1, wherein the corrected edge extraction image creating unit creates the corrected edge extraction images based on a composite intensity of the intensity of the first edge and the intensity of the second edge, and
the correction coefficient is set such that the composite intensity is lower than an intensity of an edge in accordance with a magnitude of unevenness of the inspection target object to be detected.

3. A surface inspection method comprising:
forming a plurality of inspection patterns in which first patterns having a predetermined brightness or higher and second patterns having a brightness lower than the brightness of the first patterns are alternately arranged, and sequentially deviated by a predetermined deviation amount in a direction in which the first patterns and the second patterns are alternately arranged;
projecting the plurality of inspection patterns formed in the forming onto an inspection target object by sequentially displaying the plurality of inspection patterns on a display screen;
acquiring a captured image of the inspection target object each time the inspection pattern is projected;
extracting an edge from each of a plurality of captured images acquired in the acquiring, and creating an edge extraction image, for every captured image, which represents the extracted edge based on a difference in a brightness value between the edge and a portion other than the edge;
setting a correction coefficient for correcting an intensity of a first edge in a predetermined first direction in the edge extraction image and an intensity of a second edge in a second direction orthogonal to the first direction in the edge extraction image, based on the intensity of the first edge and the intensity of the second edge, so as to reduce a degree of influence of one of the intensity of the first edge and the intensity of the second edge against the other;
correcting the intensity of the first edge and the intensity of the second edge based on the correction coefficient;
creating a plurality of corrected edge extraction images from the plurality of edge extraction images based on the intensity of the first edge and the intensity of the second edge which are corrected in the correcting;
creating a single integrated image by integrating the brightness values at the same position of the inspection target object throughout the plurality of corrected edge extraction images; and
dividing the integrated image into a plurality of sections and determining the presence or absence of unevenness on a surface of the inspection target object based on the brightness values for every divided section.

* * * * *